United States Patent
Baird et al.

(10) Patent No.: US 7,560,855 B2
(45) Date of Patent: Jul. 14, 2009

(54) FERROELECTRIC ENERGY GENERATOR, SYSTEM, AND METHOD

(75) Inventors: Jason Baird, Rolla, MO (US); Sergey Shkuratov, Lubbock, TX (US)

(73) Assignee: Loki Incorporated, Rolla, MO (US)

( * ) Notice: Subject to any disclaimer, the term of this patent is extended or adjusted under 35 U.S.C. 154(b) by 282 days.

(21) Appl. No.: 11/461,349

(22) Filed: Jul. 31, 2006

(65) Prior Publication Data
US 2009/0152989 A1 Jun. 18, 2009

(51) Int. Cl.
*H01L 41/08* (2006.01)
(52) U.S. Cl. ...................... 310/339
(58) Field of Classification Search ........... 310/322, 310/328, 334, 338, 339, 340, 344
See application file for complete search history.

(56) References Cited

U.S. PATENT DOCUMENTS

| | | | | |
|---|---|---|---|---|
| 3,922,968 A | * | 12/1975 | Conger et al. ............. | 102/214 |
| 4,051,396 A | * | 9/1977 | Berlincourt ............... | 310/339 |
| 4,370,576 A | | 1/1983 | Foster et al. | |
| 4,567,829 A | * | 2/1986 | Ziemba et al. ............ | 102/211 |
| 4,862,021 A | | 8/1989 | LaRocca | |
| 4,893,049 A | * | 1/1990 | Bundy et al. ............. | 310/338 |
| 5,059,839 A | | 10/1991 | Rose et al. | |
| 5,415,105 A | * | 5/1995 | Voss et al. ............... | 102/476 |
| 5,536,990 A | * | 7/1996 | Nelson .................... | 310/339 |
| 5,780,764 A | * | 7/1998 | Welch et al. ............. | 102/318 |
| 6,114,800 A | * | 9/2000 | Unami et al. ............. | 310/344 |

FOREIGN PATENT DOCUMENTS

GB 2208455 3/1989

OTHER PUBLICATIONS

Agency for Defense Development; Jaimin Lee, Cheon H. Kim, Jeong H. Kuk, Jin K. Kim, Jae W. Ahn; Design of a Compact Epoxy Molded Pulsed Transformer; Daejeon, Korea.
Loki Incorporated; Sergey I. Shkuratov, Evgueni F. Talantsev, Jason Baird, Henryk Temkin, Larry L. Altgilbers, Allen H. Stults;Longitudinal Shock Wave Depolarization of $Pb(Zr_{52}Ti_{40})O_3$ Polycrystalline Ferroelectrics and Their Utilization in Explosive Pulsed Power; Aug. 1, 2005.
Loki Incorporated; Sergey I. Shkuratov, Evgueni F. Talantsev, Jason Baird, Larry L. Altgilbers, Allen H. Stults; Transverse Explosive Shock-Wave Compression of $Nd_2Fe_{14}B$ High-Energy Hard Ferromagnets: Induced Magnetic Phase Transition; Aug. 1, 2005.

(Continued)

*Primary Examiner*—Mark Budd
(74) *Attorney, Agent, or Firm*—Hovey Williams LLP

(57) ABSTRACT

Embodiments of the present invention provide methods and energy generators that generate electrical energy through direct explosive shock wave depolarization of at least one ferroelectric element. In one embodiment, a generator (10) comprises a ferroelectric element (12), output terminals (14) coupled with the ferroelectric element (12), an explosive charge (16), and a detonator (18) coupled with the explosive charge (16). The detonator (18) is operable to detonate the explosive charge (16) to generate a shock wave that propagates at least partially through the ferroelectric element (12) to generate a voltage across at least two of the output terminals (14).

23 Claims, 8 Drawing Sheets

OTHER PUBLICATIONS

Megagauss; V.A. Demidov, V.D. Sadunov, S.A. Kazakov, T.V. Trishchenko, A.V. Blinov, I.K. Fetisov, M.V. Korotchenko, S.N. Golosov, Ye.V. Shapovalov; Piezoceramic Power Supply of EMG; VNIIEF, Sarov, Russia; pp. 336-339.

Shanghai Institute of Ceramics, Chinese Academy of Sciences; Wang Yongling, Dai Xunhu, Sun Dazhi, Chen Huiling; The Applications of PZT95/5 Ceramics by Induced Phase Transformation; Shanghai, China; pp. 513-516.

Department of Electronic Engineering, Hong Kong, Department of Materials Science & Engineering, Beijing, China; Y.C. Chan, Y. Wang, Z.L. Gui, L.T.Li; Thermal Effects on the Dielectric and Electric Properties of Ferroelectric Ceramic-Based MLCs; pp. 328-333.

Agency for Defense Development; Jaimin Lee, Jin Soo Choi, Dong Woo Yim, Jae Woon Ahn; Output Characteristics of Explosively-Driven Ferromagnetic Generators; Republic of Korea; 2002; pp. 154-157.

V.A. Demidov, V.D. Sadunov, S.A. Kazakov, L.N. Plyashkevich, T.V. Trischenko, S.N. Golosov, A.V. Blinov, I.K. Fetisov, M.V. Korotchenko, Ye.V. Shapovalov; Helical Cascade FCG Powered by Piezogenerator; VNIIEF, Sarov, Russia; pp. 1476-1481.

V.A. Demidov, V.D. Sadunov, S.A. Kazakov, L.N. Plyashkevich, T.V. Trischenko, S.N. Golosov, A.V. Blinov, I.K. Fetisov, M.V. Korotchenko, Ye.V. Shapovalov; Helical Cascade FCG Powered by Piezogenerator; VNIIEF, Sarov, Russia; pp. 269-272.

Technical Physics; Yu. V. Sud'enkov; Electromagnetic Radiation Induced by the Failure of Piezoelectrics Under the Action of Submicrosecond Stress Pulses; vol. 46, No. 12, 2001; pp. 1588-1590.

Wikipedia.org; Explosively Pumped Flux Compression Generator; Jun. 9, 2006.

Wikipedia.org; Lead Zirconate Titnate; Jun. 30, 2006.

U.S. Appl. No. 11/461,368, filed Jul. 31, 2006, Baird, Jason, et al.

Journal of Applied Physics; Sergey I. Dhkuratov; Evjueni F. Talantsev; James C. Dickens; Magne Kristiansen; Currents Produced by Explosive Driven Transverse Chock Wave Ferromagnetic Source of Primary Power in a Coaxial Singl-Turn Seeding Coil of a Magnetocumulative Generator; vol. 93, No. 8; Apr. 15, 2003; pp. 4529-4535.

Applied Physics Letters; Sergey I. Shkuratov; Evjueni F. Talantsev; James C. Dickens; Magne Kristiansen; Jason Baird; Longitudinal-Shock-Wave Compression of $Nd_2Fe_{14}B$ High-Energy Hard Ferromagnet: The Pressure-Induced Magnetic Phase Transition; vol. 82, No. 8; Feb. 24, 2003; pp. 1248-1250.

IEEE Transactions on Plasma Science; Sergey I. Shkuratov, Evgueni F. Talantsev, James C. Dickens, Magne Kristiansen; Compact Explosive-Driven Generator of Primary Power Based on a Longitudinal Shock Wave Demagnetization of Hard Ferri- and Ferro Magnets; vol. 30, No. 5; Oct. 2002; pp. 1681-1691.

Journal of Applied Physics; S.I. Shkuratov; E.F. Talantsev, J.C. Dickens, M. Kristiansen; Shock Wave Demagnetization of $BaFe_{12}O_{19}$ Hard Ferrimagnetics; vol. 91, No. 5, Mar. 1, 2002; pp. 3007-3009.

Review of Scientific Instruments; E.F. Talantsev, S.I. Shkuratov, J.C. Dickens, M. Kristiansen; Completely Explosive Pulsed Power Minisystem; vol. 74, No. 1, Jan. 2003; pp. 225-230.

Review of Scientific Instruments; Sergey I. Shkuratov, Evjueni F. Talantsev, Letika Menon, Henryk Temkin, Jason Baird, Larry L. Altgilbers; Compact High-Voltage Generator of Primary Power Based on Shock Wave Depolarization of Lead Zirconate Titanate Piezoelectric Ceramics; vol. 75, No. 8, Aug. 2004; pp. 2766-2769.

Review of Scientific Instruments; S.I. Shkuratov, E.F. Talantsev, J.C. Dickens, M. Kristiansen; Ultracompact Explosive-Driven High-Current Source of Primary Power Based on Shock Wave Demagnetization of Nd2Fe14B Hard Ferromagnetics; vol. 73, No. 7, Jul. 2002; pp. 2738-2742.

U.S. Naval Research Laboratory; Mark Radar, Carol Sullivan, Tim Andreadis, Sergey I. Shkuratov, Jason Baird; Experimental Observation of RF Radiation Generated by an Explosively Driven Voltage Generator; Nov. 2005.

Agency for Defense Development, Daejon, Korea; Min Su Seo, Jiheon Ryu; Explosively Driven Ferroelectric Generator for Compact Pulsed Power Systems; American Institute of Physics, 2004; pp. 1313-1316.

Agency for Defense Development, Daejon, Korea; J.H. Kuk, C.H. Kim, J.W. Ahn, H.H. Lee; Pulsed High Voltage Generation by Power Conditioning of Flux Compression Generator.

MG-IX; V.D. Sadunov, V.A. Demidov, A.L. Mikhaylov, T.V. Trishchenko; Ferroceramic Source of EMG Power Supply With Linear Growth of Current; Sarov, Russia; pp. 228-231.

Journal of Applied Physics; C.E. Reynolds, G.E. Sean; Two-Wave Shock Structures in the Ferroelectric Ceramics Barium Titanate and Lead Zirconate Titanate; vol. 33, No. 7, Jul. 1962; pp. 2234-2241.

Springer-Verlag, New York, Inc.; Larry L. Altgilbers, Igor Grishnaev, Ivor R. Smith, Yuriy Tkach, Mark D.J. Brown, Bucur M. Novac, Iaroslav Tkach; Magnetocumulative Generators; 2000.

Journal of Applied Physics; Sergey I. Shkuratov, Evgueni F. Talantsev, James C. Dickens, Magne Kristiansen; Transverse Shock Wave Demagnetization of $Nd_2Fe_{14}B$ High-Energy Hard Ferromagnetics; vol. 92, No. 1, Jul. 1, 2002; pp. 159-162.

Cambridge University Press; R.F. Trunin; Shock Compression of Condensed Materials; Cambridge, United Kingdom; 1998.

Journal of Electromagnetic Phenomena; Sergey I. Shkuratov, Evgueni F. Talantsev; Powering the Coaxial Single-Turn Seed Coil of a Magnetocumulative Generator by an Explosive-Driven Shock Wave Ferromagnetic Primary Source; vol. 3, No. 4(12), 2003; pp. 452-466.

Modern Physics Letters B; Evgueni F.I Talantsev, Sergey I. Shkuratov, James C. Dickens, Magne Kristiansen; The Conductivity of a Longitudinal-Shock-Wave-Compressed Nd2Fe14B Hard Ferromagnetics; vol. 16, Issue 15-16, 2002; pp. 545-554.

Oct. 10, 2008 office action in U.S. Appl. No. 11/461,368, filed Jul. 31, 2006, 12 pages.

* cited by examiner

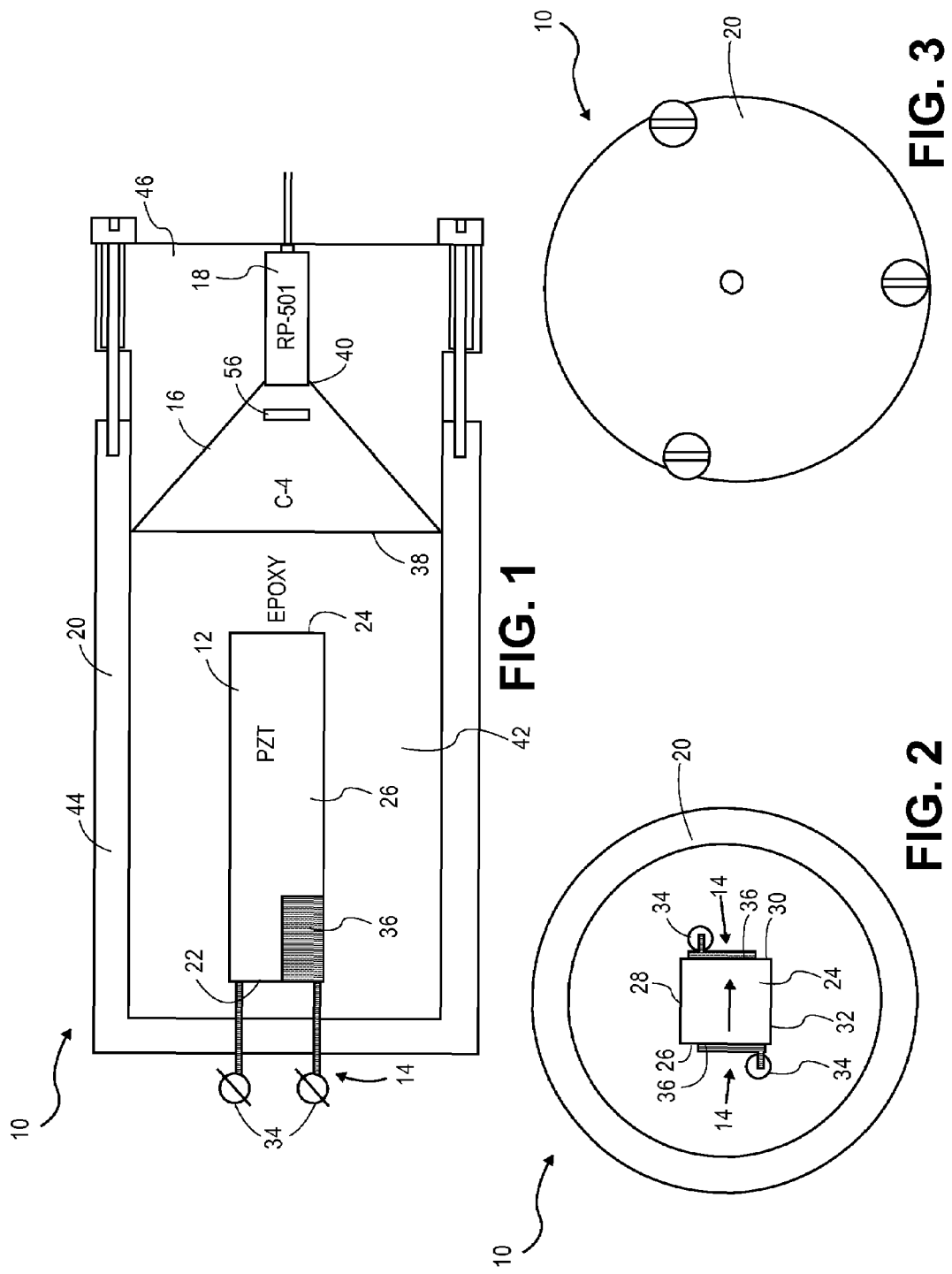

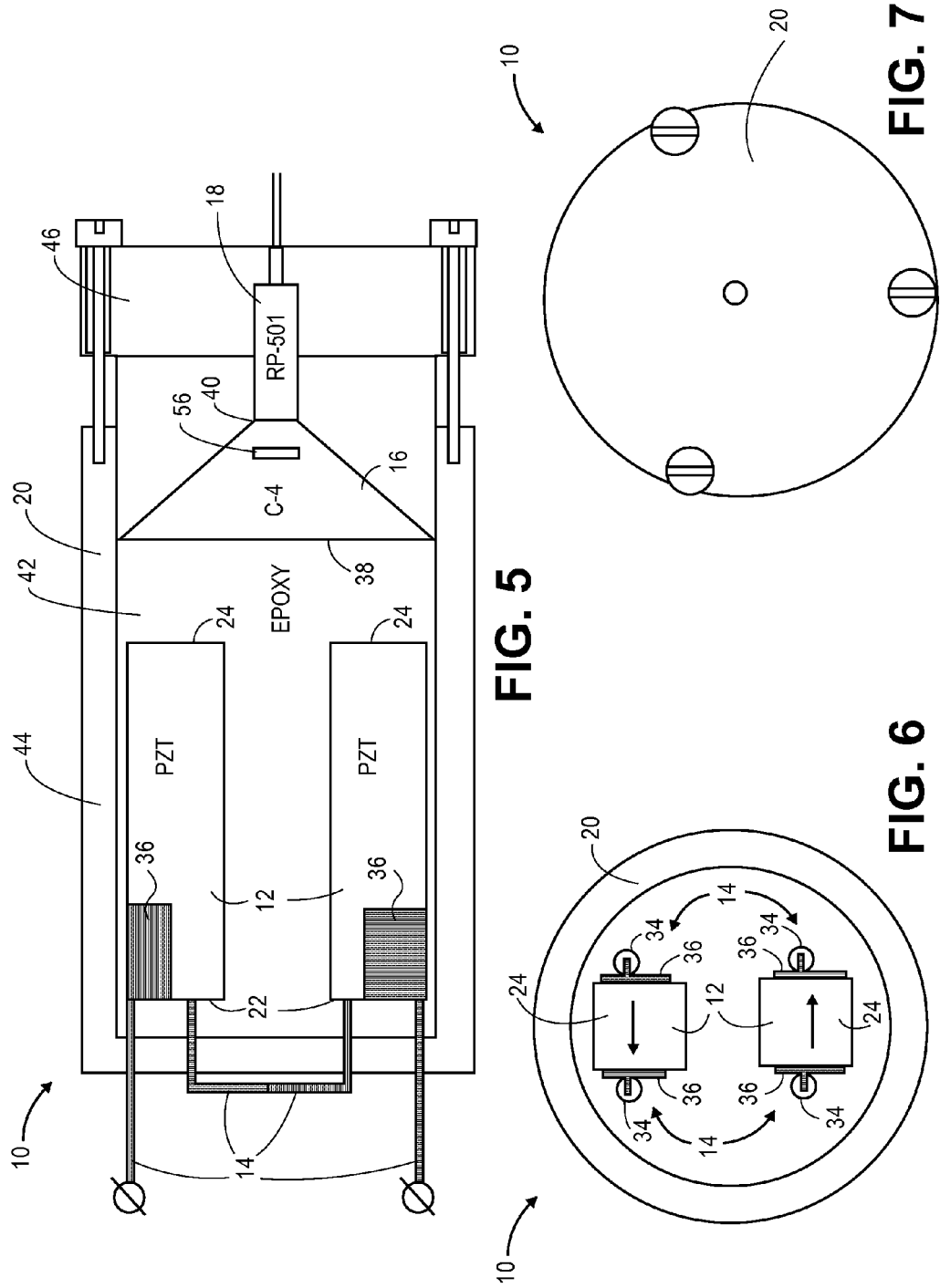

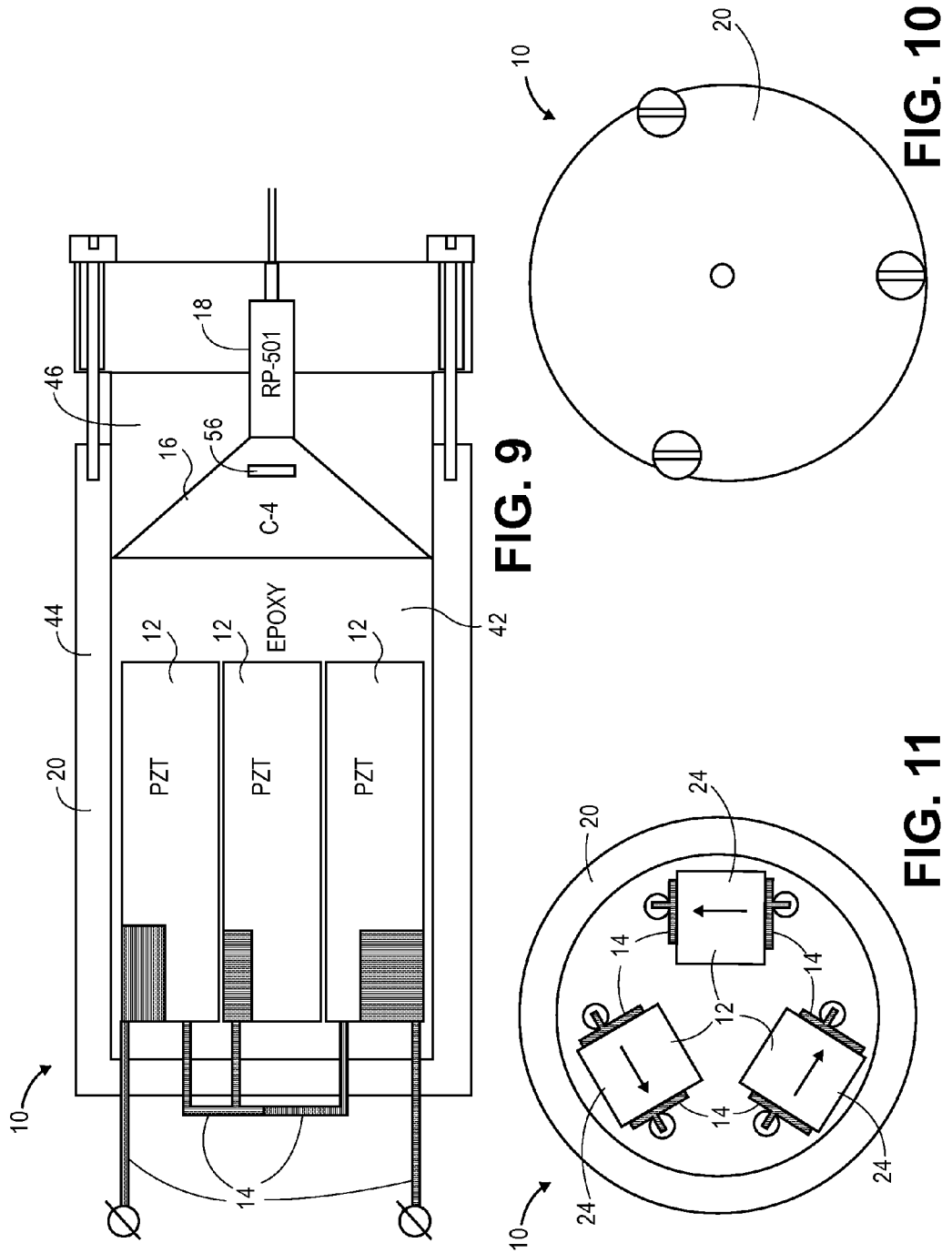

US 7,560,855 B2

FERROELECTRIC ENERGY GENERATOR, SYSTEM, AND METHOD

FEDERALLY SPONSORED RESEARCH OR DEVELOPMENT PROGRAM

The present invention was developed with support from the U.S. government under Contract Nos. W9113M-04-C-010 and W9113M-01P-0014 with the U.S. Department of Defense. Accordingly, the U.S. government has certain rights in the present invention.

BACKGROUND OF THE INVENTION

1. Field of the Invention

Embodiments of the present invention relate to ferroelectric energy generators, systems, and methods. More particularly, various embodiments of the present invention relate to an energy generator that generates electrical energy through direct explosive shock wave depolarization of at least one ferroelectric element.

2. Description of the Related Art

Many commercial and scientific applications use large amounts of electrical energy. One source of large amounts of electrical energy is explosive-driven pulsed power energy generators. Explosive-driven pulsed power energy generators generate high amplitude pulses of energy through detonation of an explosive charge. Specifically, detonation of an explosive charge positioned in proximity to ferroelectric elements may generate large amounts of electrical energy. Known methods of ferroelectric energy generation require the use of impactors, flyer plates, projectiles, or impedance matching materials to physically deform the ferroelectric elements and generate electrical energy. Unfortunately, use of these techniques increases the complexity of ferroelectric energy generators and inhibits efficient energy generation.

SUMMARY OF THE INVENTION

Embodiments of the present invention solve the above-described problems and provide a distinct advance in the art of energy generation. More particularly, various embodiments of the invention provide an energy generator that generates electrical energy through direct explosive shock wave depolarization of at least one ferroelectric element. Such a configuration enables large amounts of electrical energy to be efficiently generated.

In one embodiment, the generator generally comprises a ferroelectric element, output terminals coupled with the ferroelectric element, an explosive charge, and a detonator coupled with the explosive charge. The detonator is operable to detonate the explosive charge to generate a shock wave that propagates at least partially through the ferroelectric element to generate a voltage across at least two of the output terminals.

In another embodiment, the generator generally comprises a ferroelectric element, output terminals coupled with the ferroelectric element, a generally conical explosive charge, a detonator coupled with the explosive charge, and a housing to house at least portions of the ferroelectric element, the output terminals, the explosive charge, and the detonator. The ferroelectric element has a first end, a second end, and a polarization represented by a polarization vector. The explosive charge is positioned in proximity to the second end of the ferroelectric element and has a base and an apex positioned such that the base is directed towards the ferroelectric element and the apex is directed away from the ferroelectric element. The detonator is operable to detonate the explosive charge to generate a shock wave that propagates at least partially through the ferroelectric element generally transverse to the polarization vector to at least partially depolarize the ferroelectric element and generate a voltage across at least two of the output terminals.

In another embodiment, the generator generally comprises a plurality of ferroelectric elements, two output terminals coupled with each ferroelectric element, a generally conical explosive charge, a detonator coupled with the explosive charge, and a housing to house at least portions of the ferroelectric element, the output terminals, the explosive charge, and the detonator. Each ferroelectric element presents a rectangular configuration having a first end and a second end, has a polarization represented by a polarization vector, and is comprised at least partially of lead zirconate titanate. The explosive charge is positioned in proximity to the second ends of the ferroelectric elements and has a base and an apex positioned such that the base is directed towards the ferroelectric elements and the apex is directed away from the ferroelectric elements. The detonator is operable to detonate the explosive charge to generate a shock wave that propagates at least partially through the ferroelectric elements generally transverse to the polarization vectors to at least partially depolarize the ferroelectric elements and generate a voltage across at least two of the output terminals.

In another embodiment, the generator includes a ferroelectric element, output terminals coupled with the ferroelectric element, and a housing to house at least portions of the ferroelectric element and the output terminals. The housing is operable to couple with an explosive charge such that detonation of the explosive charge generates a shock wave that propagates at least partially through the ferroelectric element to generate a voltage across at least two of the output terminals.

In another embodiment, the present invention provides a method of generating electrical energy. The method generally includes positioning a ferroelectric element in proximity to an explosive charge, coupling output terminals with the ferroelectric element, and detonating the explosive charge to generate a shock wave that propagates at least partially through the ferroelectric element to generate a voltage across at least two of the output terminals.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 1 is a block diagram of an energy generator configured in accordance with various preferred embodiments of the present invention, the energy generator shown including one ferroelectric element;

FIG. 2 is a bottom view of the energy generator of FIG. 1;

FIG. 3 is a top view of the energy generator of FIGS. 1-2;

FIG. 5 is a block diagram of another energy generator configured in accordance with various preferred embodiments of the present invention, the energy generator shown including two ferroelectric elements;

FIG. 6 is a bottom view of the energy generator of FIG. 5;

FIG. 7 is a top view of the energy generator of FIGS. 5-6;

FIG. 9 is a block diagram of another energy generator configured in accordance with various preferred embodiments of the present invention, the energy generator shown including three ferroelectric elements;

FIG. 10 is a bottom view of the energy generator of FIG. 9;

FIG. 11 is a top view of the energy generator of FIGS. 9-10;

Figure 4:
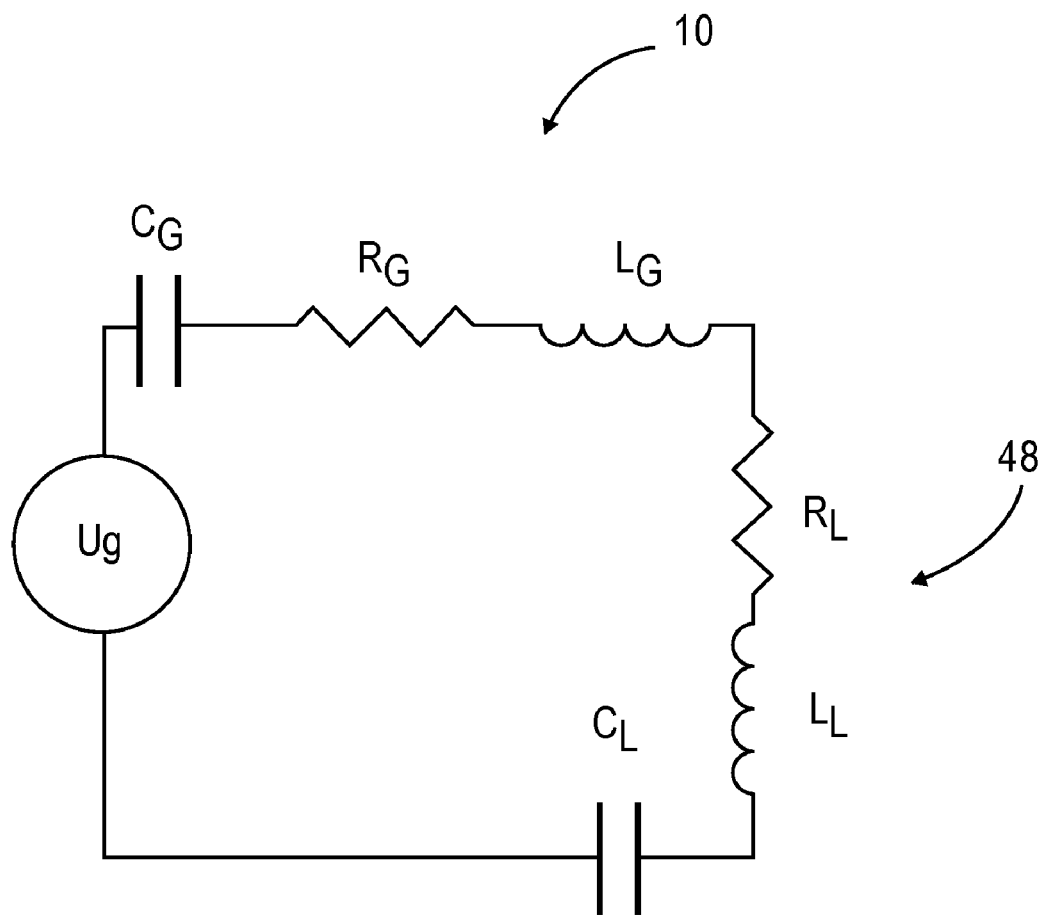
FIG. 4 is a schematic diagram of the energy generator of FIGS. 1-3 coupled with an antenna element.
Figure 8:
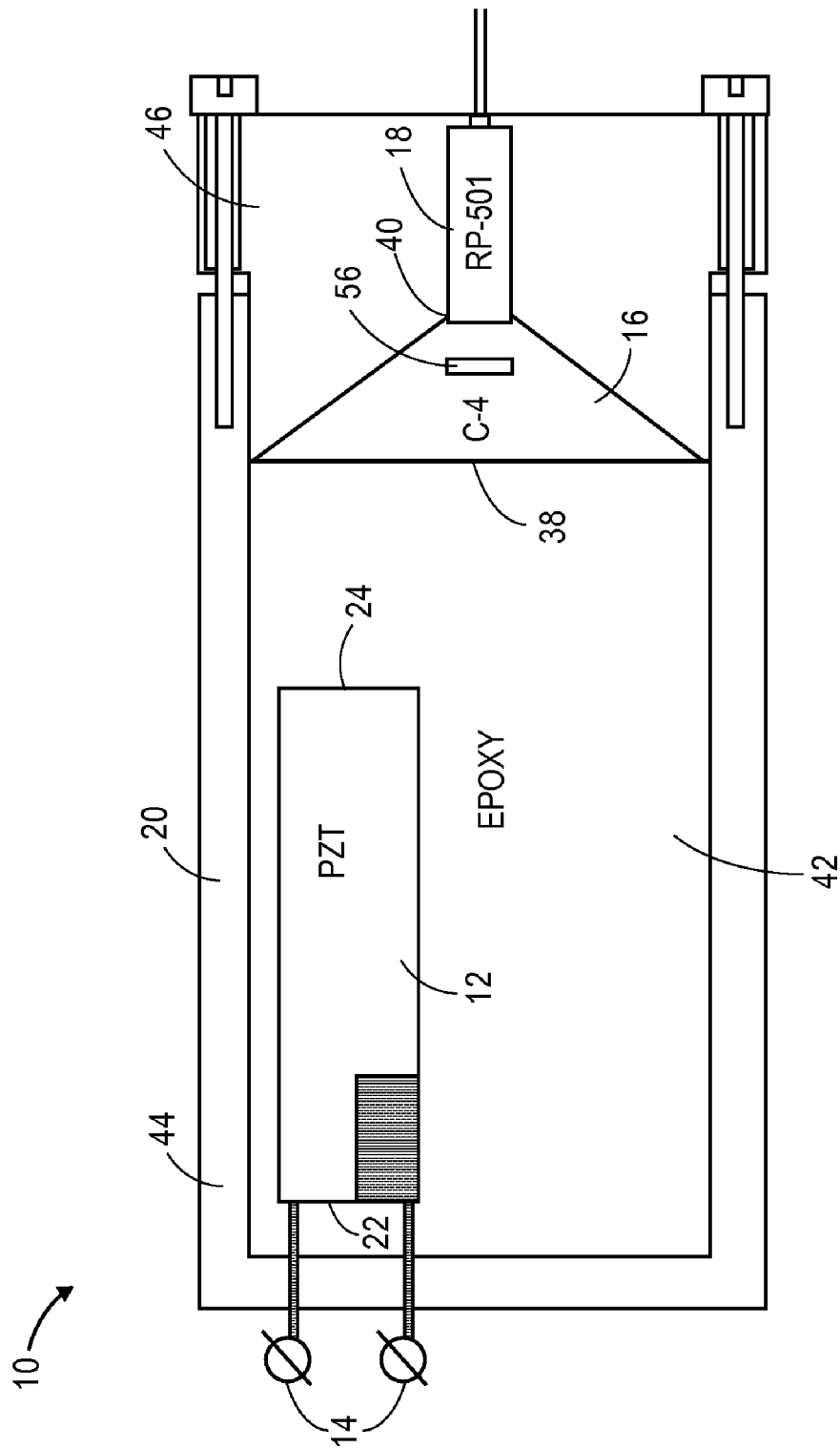
FIG. 8 is a block diagram of another energy generator configured in accordance with various preferred embodiments of the present invention, the energy generator shown including an offset ferroelectric element.

The drawing figures do not limit the present invention to the specific embodiments disclosed and described herein. The drawings are not necessarily to scale, emphasis instead being placed upon clearly illustrating the principles of various embodiments of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

As shown in FIGS. 1-14, various embodiments of the present invention provide an energy generator 10 operable to generate electrical energy through direct explosive shock wave depolarization of at least one ferroelectric element 12. The generator 10 generally includes the ferroelectric element 12, output terminals 14 coupled with the ferroelectric element 12, an explosive charge 16, a detonator 18 coupled with the explosive charge 16, and a housing 20 for at least partially housing various portions of the generator 10.

The ferroelectric element 12 may be comprised of any ferroelectric or piezoelectric material. "Ferroelectric material" as utilized herein refers to any material that possesses a spontaneous dipole moment. The spontaneous dipole moment provided by ferroelectric materials is in contrast to the permanent magnetic moment provided by ferromagnetic materials. In various embodiments, the ferroelectric element 12 is comprised of lead zirconate titanate, $Pb(Zr_{52}Ti_{48})O_3$. Utilization of lead zirconate titanate is desirable in various embodiments as it provides a marked piezoelectric effect. Specifically, when compressed and/or depolarized, lead zirconate titante will develop a substantial voltage difference across two of its faces, as is discussed below in more detail. However, in some embodiments, the ferroelectric element 12 may comprise barium titanate, $BaTiO_3$, or other ferroelectric or piezoelectric materials. The ferroelectric element 12 may be comprised of hard or soft lead zirconate titanate.

The ferroelectric element 12 preferably presents a generally rectangular configuration to enable the ferroelectric element 12 to present opposed first and second ends 22, 24 and four sides 26, 28, 30, 32 extending between the ends 22, 24. However, as should be appreciated, the ferroelectric element 12 may be formed in any shape or configuration, including cylindrical and non-uniform configurations.

The polarization of the ferroelectric element 12 is represented by a polarization vector. As shown in FIG. 2, the polarization vector is preferably generally transverse to the longitudinal axis of the ferroelectric element 12. For instance, the polarization vector preferably extends from the side 26 to side 30 instead of from end 22 to end 24. As discussed in more detail below, such a configuration facilitates the generation of energy by allowing a generated shock wave to propagate generally transverse to the polarization vector instead of generally parallel to the polarization vector. However, the ferroelectric element 12 may be polarized in any direction or orientation.

The ferroelectric element 12 may present any size. For example, the size, such as the volume, length, width, etc, of the ferroelectric element 12 may be varied to provide certain or desired voltages. In preferred embodiments, the ferroelectric element 12 presents a generally elongated rectangular configuration having dimensions of approximately 12.7 mm by 12.7 mm by 51 mm. In some embodiments, the ferroelectric element 12 may be an EC-64 bar of lead zirconate titante sold by EDO Corp. of New York, N.Y.

Figure 12:
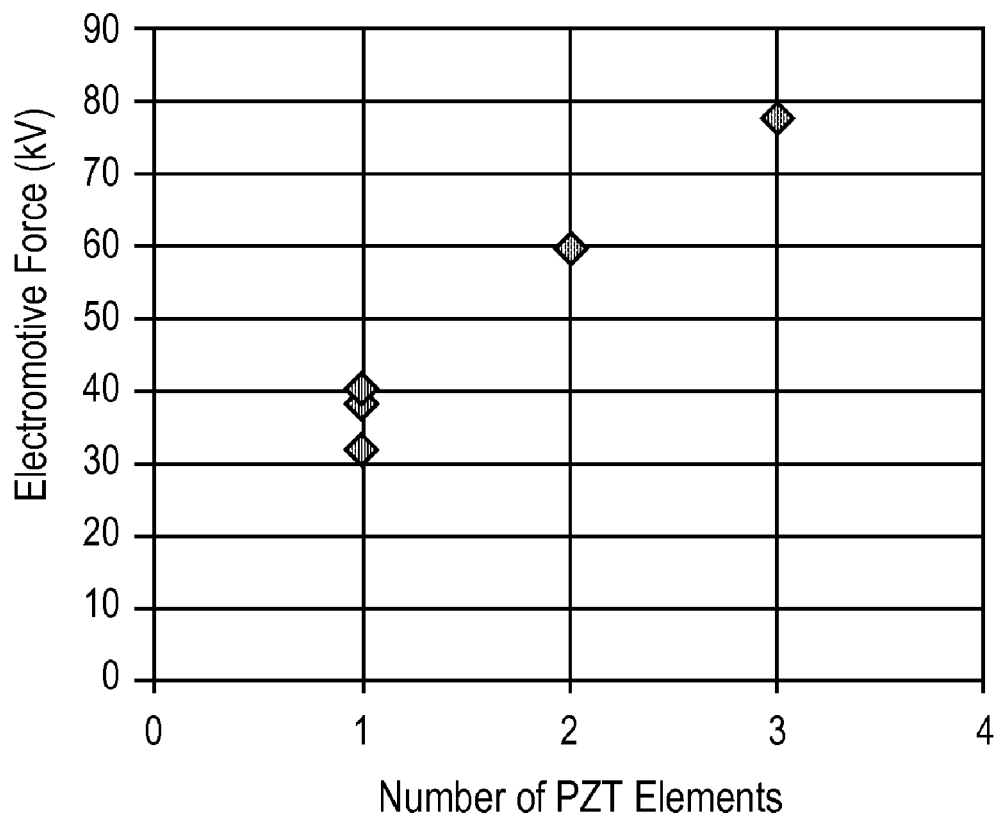
FIG. 12 is a chart showing the electromotive force provided by various embodiments of the energy generator.

As shown in FIGS. 1-3, various embodiments of the present invention may include a single ferroelectric element 12. However, in other embodiments, the generator 10 may include two ferroelectric elements 12, as shown in FIGS. 5-7, or three ferroelectric elements 12, as shown in FIGS. 9-11. As shown in FIG. 12, utilization of a plurality of ferroelectric elements 12 increases the energy output of the generator 10. Any number of ferroelectric elements 12 may be employed by the various embodiments of the present invention. For instance, large arrays of ferroelectric elements each comprising any number of ferroelectric elements may be employed to generate any amount of energy.

In embodiments including a plurality of ferroelectric elements 12, the ferroelectric elements 12 are preferably aligned such that the polarization vectors of the ferroelectric elements 12 are generally parallel. Thus, the ferroelectric elements 12 are preferably positioned such that their longitudinal axes are generally parallel. Such a configuration enables a single explosive charge, such as the explosive charge 16, to be detonated and generate a shock wave to at least partially compress and depolarize the plurality of ferroelectric elements 12. Consequently, embodiments of the present invention enable the plurality of ferroelectric elements 12 to be utilized without requiring the use of a plurality of explosive charges.

The output terminals 14 are coupled with the ferroelectric element 12 to facilitate reception and use of the energy generated through shock wave compression and depolarization of the ferroelectric element 12. As is discussed in more detail below, compression and depolarization of the ferroelectric element 12 causes a voltage to be generated across two of its sides. For instance, when compressed the ferroelectric element 12 may generate a voltage across the ends 22, 24, the sides 26, 30, the sides 28, 32, etc. Consequently, the output terminals 14 are preferably coupled with opposing sides or ends of the ferroelectric element 12 to enable a voltage to be generated across the terminals 14.

In various embodiments, the output terminals 14 are coupled with the sides 26, 30 toward the first end 22 of the ferroelectric element 12, as shown in FIGS. 1-2. Such a configuration allows the output terminals 14 to be generally aligned with the polarization vector of the ferroelectric element 12 to maximize the voltage provided by the generator 10. Positioning of the output terminals 14 in proximity to the first end 22 additionally maximizes the voltage provided by the generator 10 by allowing the ferroelectric element 12 to be substantially or fully compressed. However, the output terminals 14 may be coupled with the ferroelectric element 12 at any location.

In some embodiments, the output terminals 14 may be directly coupled with the ferroelectric element 12. For instance, the output terminals 14 may comprise two leads inserted into the sides 26, 30 of the ferroelectric element 12. However, the output terminals 14 preferably comprise leads 34 that may be utilized to provide generated voltage to external devices and contact pads 36 coupled with both the leads 34 and the ferroelectric element 12. Utilization of contact pads 36 enables the terminals 14 to easily couple with the ferroelectric element 12. Further, utilization of contract pads 36 increases the surface area between the ferroelectric element 12 and the output terminals 14 and thus increases the voltage provided to the output terminals 14 by compression of the ferroelectric element 12. The contact pads 36 may be conventionally adhered to or otherwise coupled with the ferroelectric element 12.

The explosive charge 16 may be any explosive element operable to initiate a shock wave that propagates at least partially through the ferroelectric element 12. Preferably, the explosive charge 16 includes high explosive elements to reduce the volume and amount of material required to initiate the desired shock wave discussed below. More preferably, the explosive charge 16 includes or is otherwise formed from a cyclotrimethylene trinitramine (RDX) high explosive or other detonable high explosive.

The explosive charge 16 preferably presents a generally conical configuration having a base 38 and an apex 40. As shown in FIG. 1, the explosive charge 16 is preferably positioned such that the base 38 is directed towards the ferroelectric element 12 and the apex 40 is directed away from the ferroelectric element 12. The explosive charge 16 is coupled with the detonator 18 in proximity to the apex 40. Such a configuration facilitates generation of the desired transverse shock wave discussed below. Utilization of a malleable explosive also facilitates formation of the various embodiments of the present invention by enabling the explosive charge 16 to be easily formed into the desired conical configuration. However, as should be appreciated, the explosive charge 16 may present any shape and be malleable or non-malleable.

The detonator 18 is coupled with the explosive charge 16 to enable detonation of the explosive charge 16 and generation of the desired shock wave. As discussed above, the detonator 18 is preferably coupled with the apex 40 of the explosive charge 16. However, the detonator 18 may be directly or indirectly coupled in any configuration with the explosive charge 16. In various embodiments, the detonator 18 includes a RD-501 EBW detonator. However, the detonator 18 may include any elements operable to detonate the explosive charge 16 and may be specifically configured for compatibility with the explosive charge 16. The detonator 18 is preferably coupled with an external control system to control the function and timing of the detonation of the explosive charge 16.

Embodiments of the present invention preferably include the housing 20 to house at least portions of the ferroelectric element 12, the output terminals 14, the explosive charge 16, and the detonator 18. Utilization of the housing 20 enables the generator 10 to be easily transported without damage and also prevents potentially caustic elements of the generator 10, such as the explosive charge 16 and detonator 18, from coming into undesirable contact with external elements such as sensitive equipment or people. The housing 20 also facilitates desirable positioning of the various generator 10 elements, such as the ferroelectric element 12 and the explosive charge 16, by restricting their movement. In some embodiments, the housing 20 may be at least partially filled with a dielectric filling 42 to facilitate positioning and shock matching of the ferroelectric element 12. For instance, the dielectric filling 42 may include epoxy or any other hardening substance to solidify the position of the ferroelectric element 12 and the explosive charge 16.

The housing 20 is preferably comprised of resilient materials to protect the various generator 10 elements, such as various plastics, woods, or metals. In some embodiments the housing 20 is comprised of materials that are less likely than other materials to harm bystanders or nearby equipment when the explosive charge 16 is detonated. For example, in some embodiments it may be desirable to form the housing 20 from plastics, such as polyethylene, to minimize the risk of injury caused by flying debris and shrapnel when the explosive charge 16 is detonated.

The housing 20 may present any shape or configuration. In some embodiments, the housing 20 may present a generally cylindrical or tubular configuration as shown in FIGS. 1-3. In some embodiments employing a cylindrical configuration, the housing 20 has a length of approximately 100 mm and an outer diameter of approximately 55 mm. Thus, the present invention may be compactly employed to provide large amounts of electrical energy. However, the housing 20 may be any size in order to include any number of ferroelectric elements 12.

In various embodiments, the housing 20 is comprised of a cylinder 44 and a charge holder 46. The cylinder 44 is preferably comprised of polyethylene and includes a generally closed bottom and cylindrical sides extending therefrom. The cylinder 44 retains the ferroelectric elements 12 and is at least partially filled with the dielectric filing 42 as discussed above. The output terminals 14 may protrude from the bottom of the cylinder 44.

The charge holder 46 is also preferably comprised of polyethylene and is operable to retain the explosive charge 16 and the detonator 18. Preferably, the charge holder 46 includes a generally concave recess to facilitate shaping and positioning of the explosive charge 16. The ends of the charge holder 46 are preferably open such that the base 38 of the explosive charge 16 may face the ferroelectric element 12 and the detonator 18 may be coupled with external control equipment, as shown in FIG. 1. The charge holder 46 may couple with the cylinder 44 utilizing conventional coupling, fastening, or interlocking elements.

Utilization of the cylinder 44 and charge holder 46 enables the generator 10 to be easily formed, stored, and operated. For instance, the cylinders 44 may be stored in a generally conventional manner, as they include non-explosive elements, while the potentially volatile charge holder 46 and explosive charge 16 may be stored utilizing appropriate safety measures. Further, utilization of both the cylinder 44 and charge holder 46 facilitates alignment of the explosive charge 16 and the ferroelectric element 12 to generate the desired shock wave.

In some embodiments, a shock wave shaper 56 may be positioned within or coupled with the explosive charge 16 to shape the shock wave resulting from detonation of the explosive charge 16 in a desired manner. For instance, the shock wave shaper 56 may be positioned such that, in combination with the angle and size of the charge holder 46, the generated shock wave is approximately planar at the end of the charge 16. Such a configuration facilitates the generation of a shock wave that is at a desired angle to the polarization vector of the ferroelectric element 12 as discussed below.

The generator 10 may be coupled with any external elements, systems, or devices to provide electrical energy thereto. Specifically, the output terminals 14 may be coupled in various configurations with external elements, systems, and/or devices to provide electrical energy thereto. In some embodiments, the generator 10 may be coupled with an antenna element 48 utilizing the output terminals 14. The antenna element 48 is operable to radiate energy utilizing the voltage provided by the generator 10. Such a configuration enables the generator 10 and the antenna element 48 to form a compact and high-power microwave system that may be easily transported and utilized in remote environments.

In some embodiments, the antenna element 48 may comprise a length of wire or cable, such as a 1.4 meter RG-8 50 ohm cable, that is directly connected to the output terminals 14. The schematic diagram of FIG. 4 illustrates the circuit equivalent of this configuration, where $L_G$ and $R_G$ are the inductance and resistance of the shock-wave compressed part of the ferroelectric element 12, $C_G$ is the capacitance of the uncompressed part of the ferroelectric element 12, $C_L$ is the capacitance of the cable, and $R_L$ and $L_L$ are the resistance and inductance of the cable and any connecting wires.

Figure 14:
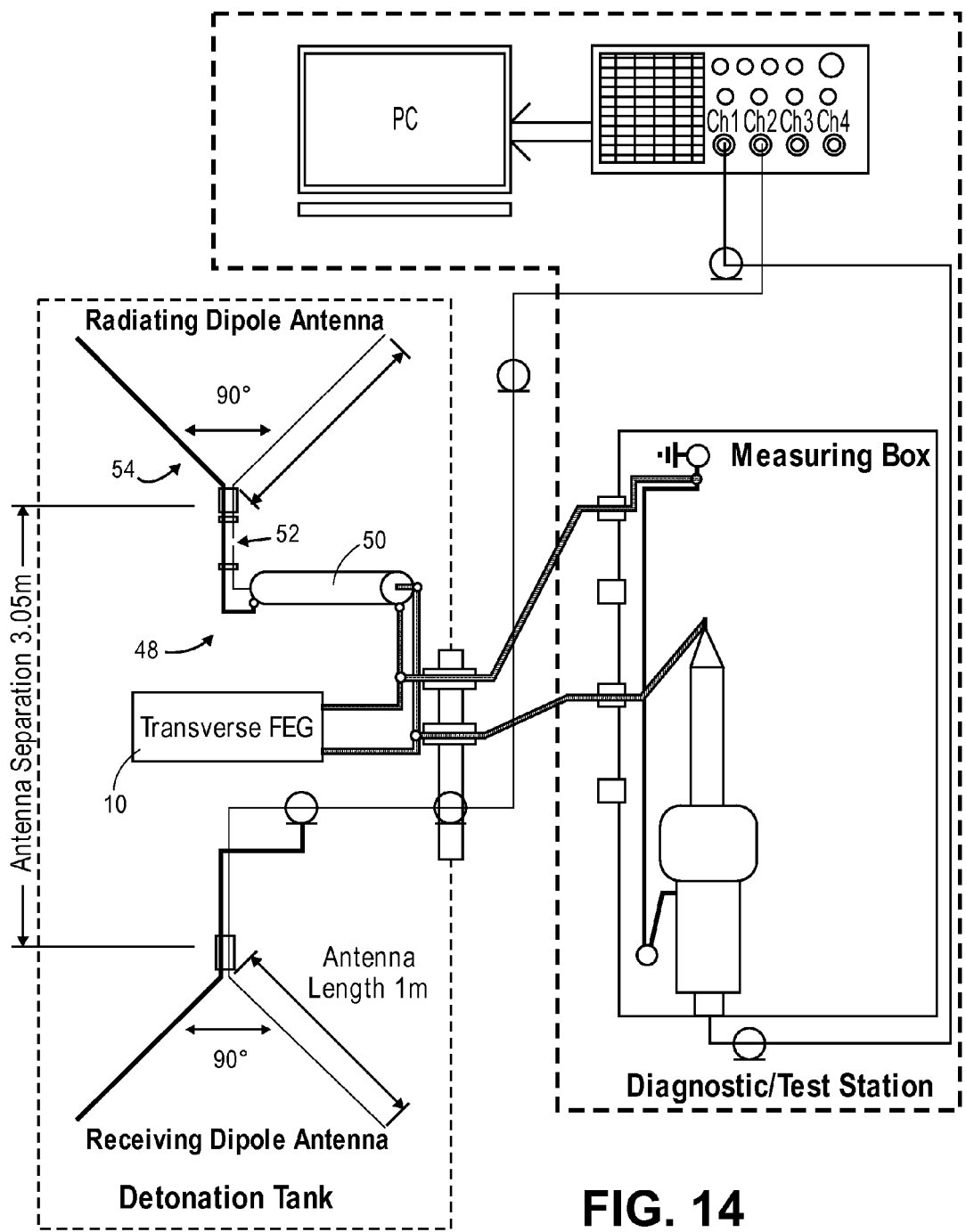
FIG. 14 is a schematic diagram showing the energy generator of FIG. 9 coupled with various test equipment and an antenna element.

In other embodiments, such as the embodiment shown in FIG. 14, the antenna element 48 may comprise a cable 50 coupled at with at least one of the output terminals 14, such as a 1.4-meter length of RG-8 50 ohm cable, a spark gap switch 52 coupled with the cable 50, and a dipole antenna 54 coupled with the spark gap switch 52. In such configurations, the inner-electrode distance provided by the spark gap switch 52 may be varied to determine the operating voltage of the switch 52, and thus the operating voltage of the dipole antenna 54. In some embodiments, the inner-electrode distance of the spark gap switch 52 is preferably approximately 1 mm to 20 mm, and more preferably in the 2 mm to 8 mm range.

Shortening the length of the inner-electrode distance of the spark gap switch 52 leads to a lower inductance of the switch 52, and correspondingly increases the frequency of microwaves radiated by the dipole antenna 54, decreases the operating voltage of the switch 52, and decreases the amplitude of the radiated microwaves. The dipole antenna 54 is preferably a conventional dipole antenna having a length of approximately 1 m. However, as should be appreciated, the dipole antenna 54 may present any configuration or size to generate particular microwaves or other electromagnetic waves. Further, in some embodiments the spark gap switch 52 may be directly coupled with the output terminals 14 such that utilization of the cable 50 is not necessary.

Utilization of the generator 10, spark gap switch 52, and dipole antenna 54, enables a compact microwave system to be easily constructed at low cost. Further, such a combination is reliable and durable and does not utilize complex electronics or mechanical elements, thereby allowing the system to be easily transported and used in areas where electrical energy is not readily available.

Figure 13:
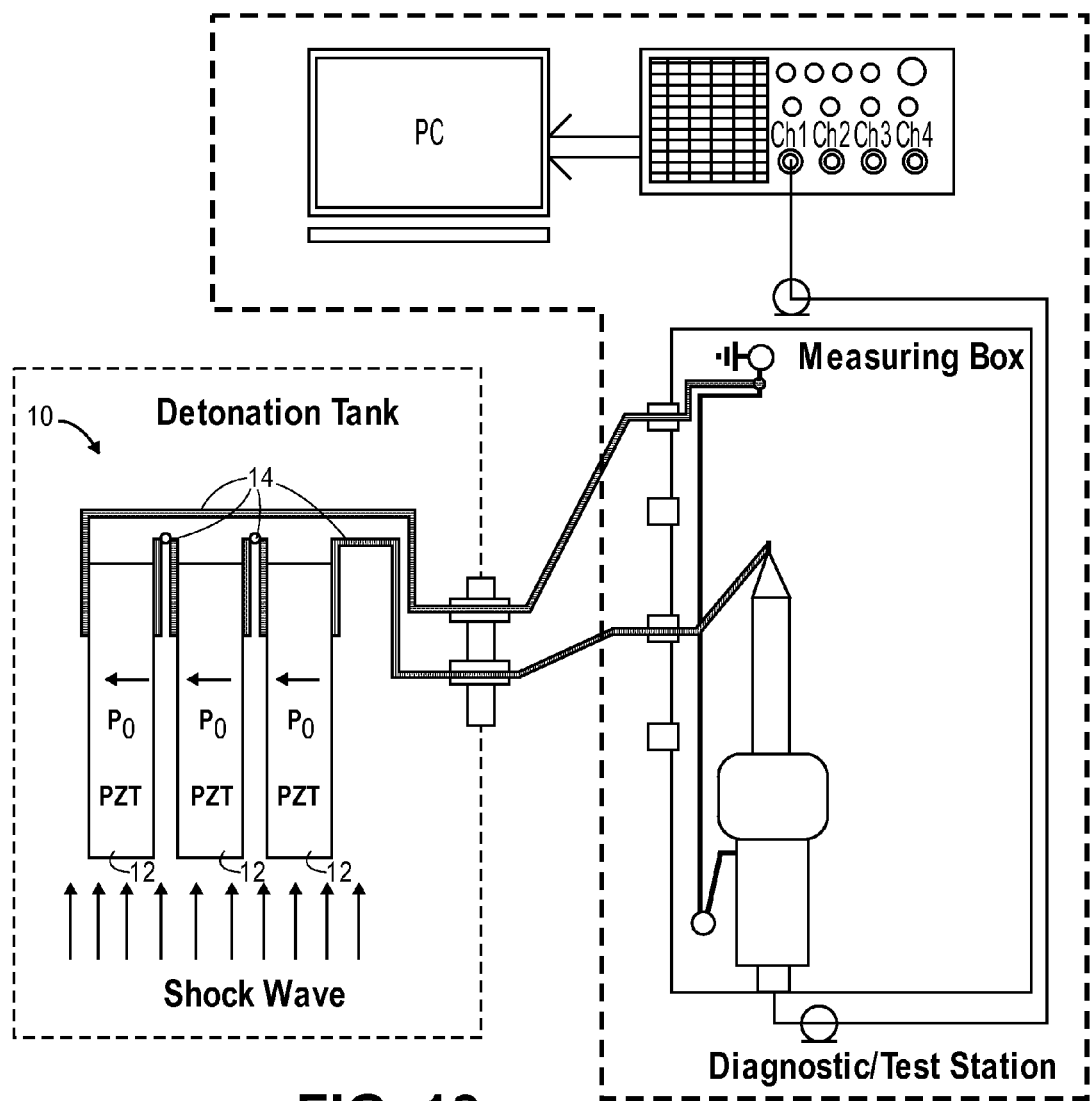
FIG. 13 is a schematic diagram showing the energy generator of FIG. 9 coupled with various test equipment.

As shown in FIGS. 13-14, the generator 10 may be coupled with test equipment to utilize or analyze the generated energy. The test equipment may include current and voltage monitors, oscilloscopes, circuit analyzers, personal computing and digital equipment devices, etc. Preferably, the test equipment is coupled with the output terminals 14 to measure, detect, analyze, or otherwise utilize the energy generated by the generator 10.

In operation, the generator 10 is configured as discussed above. The generator 10 may be utilized to generate electrical energy independent of the antenna element 48 such that utilization of the antenna element 48 is not necessary in all embodiments. For instance, the generator 10 may be configured to provide electrical energy for remote sensing or remote microwave functions, to provide energy to electromagnetic propulsion systems such as rail guns, to charge a capacitor bank, to provide an initial charge for a plasma/fusion containment device, to power a laser or electron beam, etc.

To generate electrical energy, the detonator 18 is detonated by a user. For example, the user may apply an electrical charge to the detonator 18 utilizing control equipment such as a computing or test device to detonate the explosive charge 16. Detonation of the explosive charge 16 causes a shock wave to radiate therefrom. Due to the positioning of the explosive charge 16 and the ferroelectric element 12, the shock wave generated by the explosive charge 16 is preferably generally transverse to the polarization vector of the ferroelectric element 12. In embodiments where the explosive charge 16 is generally conically shaped, the conical shaping further facilitates generation of the desirable shock wave transverse to the polarization vector of the ferroelectric element 12. In embodiments were a plurality of ferroelectric elements 12 are utilized the generated shock wave propagates generally transverse to the polarization vector of each ferroelectric element 12 to increase the efficiency of the generator 10.

As the shock wave propagates through the ferroelectric element 12 generally transverse to the polarization vector, the propagating shock wave causes the ferroelectric element 12 to be at least partially compressed and depolarized. Such depolarization of the ferroelectric element 12 causes a voltage to be generated across its opposing sides, such as the sides 26, 30. Thus, embodiments of the present invention do not require the use of impactor or flyer plates to compress and depolarize the ferroelectric element 12.

In some embodiments the shock wave generated by detonation of the explosive charge 16 is not necessarily transverse to the polarization vector of the ferroelectric element 12. For instance, the generated shock wave may propagate through the ferroelectric element 12 at any angle relative to the polarization vector, including non-transverse, parallel, or any other angle, depending on the particular configuration of the ferroelectric element 12 and explosive charge 16.

Consequently, the present invention enables the ferroelectric element 12 to be compressed and depolarized through direct shock wave action, thereby increasing the reliability, effectiveness, and efficiency of the generator 10. As should be appreciated, the ferroelectric element 12 does not need to be completely or totally compressed and depolarized by the shock wave. Thus, embodiments of the present invention may generate energy through only partial depolarization and compression of the ferroelectric element 12.

The output terminals 14 are coupled with the sides 26, 30 to allow the generated energy to propagate from the ferroelectric element 12. In embodiments where a plurality of ferroelectric elements 12 are utilized, at least a portion of each ferroelectric element 12 is compressed and depolarized to generate a voltage across each of the elements' respective output terminals 14. The output terminals 14 of the plurality of ferroelectric elements 12 may be coupled in any parallel, serial, or other configuration to provide a desired electrical output. The output terminals 14 may be coupled with the antenna element 48 as discussed above to generate microwaves or other electromagnetic waves.

Utilization of the generator 10 enables substantial amounts of electrical energy to be generated. For example, as shown in FIG. 12, embodiments of the present invention employing ferroelectric elements 12 having dimensions of approximately 12.7 mm by 12.7 mm by 51 mm are operable to generate between approximately 30 kV and 40 kV if one ferroelectric element 12 is utilized, and up to approximately 80 kV if three ferroelectric elements 12 are utilized. Utilization of additional ferroelectric elements 12, such as four or more ferroelectric elements, enables various embodiments of the present invention to provide greater than 80 kV of generated energy.

In embodiments where the generator 10 is coupled with the antenna element 48, substantial microwaves may also be generated. For instance, various embodiments of the present invention discussed in the preceding paragraph and employing the antenna element 48 may generate microwaves having a frequency in the 20 MHz to 50 MHz range and amplitudes exceeding 100 V.

The generator 10 additionally provides electrical energy rapidly. For instance, in some embodiments, the generator 10 may provide its maximum voltage less than a microsecond after detonation of the explosive charge 16. Depending upon the configuration of the present invention, some embodiments are operable to provide electrical energy in the form of a pulse having duration in the range of 2 to 8 microseconds. Thus, embodiments of the present invention are well suited to applications requiring an immediate or quick burst of electrical energy.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An energy generator comprising:
 a ferroelectric element;
 output terminals coupled with the ferroelectric element;
 an explosive charge presenting a generally conical configuration having a base and an apex, the explosive charge being positioned such that the base is directed towards the ferroelectric element and the apex is directed away from the ferroelectric element; and
 a detonator coupled with the explosive charge, wherein the detonator is operable to detonate the explosive charge to generate a shock wave that propagates at least partially through the ferroelectric element to generate a voltage across at least two of the output terminals.

2. The generator of claim 1, wherein the ferroelectric element has a polarization represented by a polarization vector and the generated shock wave propagates at least partially through the ferroelectric element generally transverse to the polarization vector to at least partially depolarize the ferroelectric element.

3. The generator of claim 1, wherein the ferroelectric element has a polarization represented by a polarization vector and the generated shock wave propagates at least partially through the ferroelectric element generally parallel to the polarization vector to at least partially depolarize the ferroelectric element.

4. The generator of claim 1, wherein the ferroelectric element includes lead zirconate titanate.

5. The generator of claim 1, wherein the output terminals are coupled with opposing sides of the ferroelectric element.

6. The generator of claim 1, wherein the explosive charge includes a detonable high explosive.

7. The generator of claim 1, further including a housing to house at least portions of the ferroelectric element, the output terminals, the explosive charge, and the detonator.

8. An energy generator comprising:
 a ferroelectric element;
 output terminals coupled with the ferroelectric element;
 an explosive charge;
 a detonator coupled with the explosive charge, wherein the detonator is operable to detonate the explosive charge to generate a shock wave that propagates at least partially through the ferroelectric element to generate avoltage across at least two of the output terminals; and
 a housing to house at least portions of the ferroelectric element, the output terminals, the explosive charge, and the detonator, the housing including a dielectric filling to facilitating positioning and shock matching of the ferroelectric element.

9. The generator of claim 8, wherein the ferroelectric element has a polarization represented by a polarization vector and the generated shock wave propagates at least partially through the ferroelectric element generally transverse to the polarization vector to at least partially depolarize the ferroelectric element.

10. The generator of claim 8, wherein the ferroelectric element has a polarization represented by a polarization vector and the generated shock wave propagates at least partially through the ferroelectric element generally parallel to the polarization vector to at least partially depolarize the ferroelectric element.

11. The generator of claim 8, wherein the ferroelectric element includes lead zirconate titanate.

12. The generator of claim 8, wherein the output terminals are coupled with opposing sides of the ferroelectric element.

13. The generator of claim 8, wherein the explosive charge includes a detonable high explosive.

14. An energy generator comprising:
 a ferroelectric element having first end, a second end, and a polarization represented by a polarization vector;
 a generally conical explosive charge positioned in proximity to the second end of the ferroelectric element, the explosive charge having a base and an apex positioned such that the base is directed towards the ferroelectric element and the apex is directed away from the ferroelectric element;
 a detonator coupled with the explosive charge, wherein the detonator is operable to detonate the explosive charge to generate a shock wave that propagates at least partially through the ferroelectric element generally transverse to the polarization vector to at least partially depolarize the ferroelectric element and generate a voltage across at least two of the output terminals; and
 a housing to house at least portions of the ferroelectric element, the output terminals, the explosive charge, and the detonator.

15. The generator of claim 14, wherein the ferroelectric element includes lead zirconate titanate.

16. The generator of claim 14, wherein the ferroelectric element presents a generally rectangular configuration.

17. The generator of claim 16, wherein the output terminals are coupled with opposing sides of the ferroelectric element.

18. The generator of claim 14, wherein the explosive charge includes a detonable high explosive.

19. The generator of claim 14, further including a plurality of ferroelectric elements each having output terminals coupled therewith and each having a polarization represented by a polarization vector, the ferroelectric elements positioned such that detonation of the explosive charge causes the shock wave to propagate at least partially through each of the ferroelectric elements generally transverse to each of the polarization vectors to at least partially depolarize the ferroelectric elements and generate a voltage across at least two of the output terminals.

20. The generator of claim 14, further including an antenna element electrically coupled with the output terminals, the antenna element operable to radiate energy utilizing at least a portion of the generated voltage.

21. An energy generator comprising:
a plurality of ferroelectric elements, each ferroelectric element—
presenting a rectangular configuration having a first end and a second end,
having a polarization represented by a polarization vector, and
comprised at least partially of lead zirconate titanate;
a plurality of output terminals, two output terminals being coupled with each ferroelectric element in proximity to its first end;
a generally conical explosive charge positioned in proximity to the second ends of the ferroelectric elements, the explosive charge having a base and an apex positioned such that the base is directed towards the ferroelectric elements and the apex is directed away from the ferroelectric elements;
a detonator coupled with the explosive charge, wherein the detonator is operable to detonate the explosive charge to generate a shock wave
that propagates at least partially through the ferroelectric elements generally transverse to the polarization vectors to at least partially depolarize the ferroelectric elements and generate a voltage across at least two of the output terminals; and
a housing to house at least portions of the ferroelectric element, the output terminals, the explosive charge, and the detonator.

22. The generator of claim 21, wherein the explosive charge includes a detonable high explosive.

23. The generator of claim 21, further including an antenna element electrically coupled with at least one of the output terminals, the antenna element operable to radiate energy utilizing at least a portion of the generated voltage.

* * * * *